Nov. 9, 1926.  1,606,683

F. ATHIMON

BRAKE CONTROL MECHANISM

Filed Feb. 12, 1926

F. Athimon
INVENTOR

By: Marks & Clerk
Attys

Patented Nov. 9, 1926.

1,606,683

UNITED STATES PATENT OFFICE.

FRANCIS ATHIMON, OF PARIS, FRANCE.

BRAKE-CONTROL MECHANISM.

Application filed February 12, 1926, Serial No. 87,925, and in France February 17, 1925.

The present invention is chiefly applicable to the control of brakes in which in order to obtain the equivalent of a servo-motor controlled brake, there is employed firstly a cam provided with a rapid slope for obtaining the preliminary or free stroke and a more moderate slope for the stroke corresponding to effective braking, and secondly means to automatically compensate for the wear for instance the controlling device referred to in my copending patent application Serial No. 17,055, filed March 20, 1925.

In a brake control device mounted on a vehicle the transmission rod and link gear may be subject to great elongations under certain severe shocks due for instance to unevenness of the road, and it is obvious that if great shocks occur at each braking operation, the pawl or like means adapted to automatically compensate for the wear will come into action even if there is no actual wear to be taken up, and such improper adjustments will unduly reduce the preliminary or free stroke. Furthermore, since a part of the braking action itself takes place upon the rapid slope portion of the cam intended for the preliminary stroke, there will result an increased stress at this point.

In the arrangement according to my invention, I take advantage of this last condition, and I effect the preliminary stroke by bearing not upon the cam itself but upon a lever having the same outline and mounted in an elastic manner. Said lever is held in its normal position under a tension which is sufficient to withstand—without displacement—the effort normally developed during the preliminary stroke, but not strong enough to withstand the additional effort due to an improper or unnecessary adjustment. The displacement of the lever in this latter case is utilized (through suitable means) to raise the adjusting pawl or like means for the time necessary to prevent its action upon the adjusting ratchet wheel.

Further characteristics will appear from the following description.

In the appended drawings and by way of example:

Figure 1:
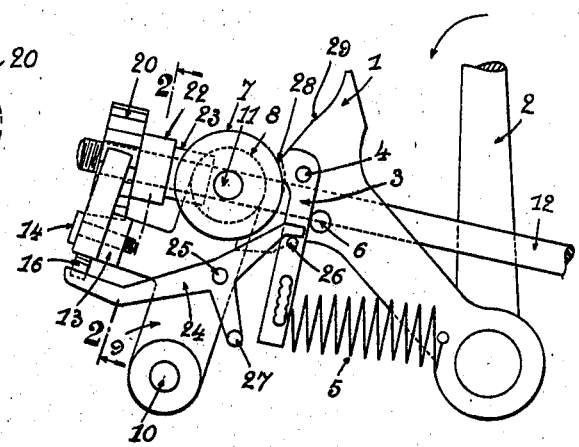
Fig. 1 is a view of the device in the inoperative position, mounted upon a brake controlling arrangement.

A preferred embodiment of the present invention consists of the following elements:

Upon the controlling cam 1 which is secured on or formed in one part with the pedal 2—partly shown in the drawings—is mounted the lever 3 which is movable on the axle 4 and is caused to bear, by means of a spring 5 whose attaching point is adjustable, firstly against an abutment 6 of the cam 1, and secondly against the roller 7 revoluble on the axle 11 mounted on the lever 9, through the fork which is formed by the said lever perpendicularly to the plane of Fig. 1; at the interior of said fork is a portion of larger diameter 8 through which is inserted the brake controlling rod 12.

Figure 2:
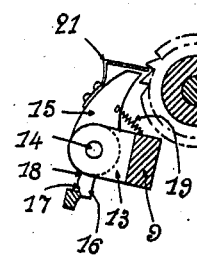
Fig. 2 is a section on the line 2—2 of Fig. 1.

The lever 9 is movable on an axle 10 which is mounted upon the vehicle frame; said lever comprises an arm 13 (Fig. 2), perpendicular to its plane and upon which is mounted preferably by means of a screw 14 a pawl 15 formed in one with a ramp 17 and a tooth 18. Said pawl is connected with the lever 9 by a small spring 19 which serves to press the tooth of the pawl against one of the teeth of a ratchet wheel 20. A small spring 21 rivetted at the top of the pawl allows a slight back motion of said pawl without moving the wheel 20; the point of the pawl acts in this manner when the traction on the rod 12 is considerably reduced, so that the points of the teeth of the wheel will not be damaged during the engagement. Adjacent the said wheel is a nut 22 mounted on the controlling rod 12 and in contact—through the extension part 23—with a cylindrical recess in the part 8 of the axle 11. A lever 24 is pivoted on an axle 25 which is mounted on the lever 9. The said lever comprises three arms enabling it to bear on one side upon the ramp 17 and on the other side upon the lever 3, either by means of the stud 26 mounted on the lever 3 or by means of the stud 27 mounted on the said lever 24.

The operation of the preferred embodiment above described is as follows:

In the operative position (Fig. 1) the brake being well adjusted and the rod 12 being pressed by the reaction springs of the brakes, the roller 7 is caused to bear upon the lever 3 and only upon the lower part of the cam 1, the upper part 29 of said cam being somewhat set back. When the brakes are thrown on, the pedal 2 will be moved in the direction of the arrow.

Due to the spring 5, the part 28 of the lever 3 will resist (without movement) the tangential stress necessary for making the preliminary stroke. The lever 24 will not act upon the ramp 17 nor upon the pawl 15; the pivoting of the lever 9 and hence the motion of the ratchet wheel 20 relatively to the pawl 15 being less than the pitch of a tooth of said ratchet wheel, there will be no pressure of the ratchet wheel upon the part 8.

Since the braking action is usually accompanied by a slight bending of the parts, it may be admitted that the braking will commence immediately after the preliminary stroke, and will attain its maximum somewhat before the point 29 of the cam 1. But if the preliminary stroke has been sufficiently increased by reason of the wear, the cam 1 may act for braking purposes for instance as far as the point 29. The lever 9 is driven farther out, and hence the relative motion of the wheel 20 and the said pawl may be sufficient to enable the latter to slip by one tooth upon the wheel, and upon returning to the inoperative position it will slightly press the wheel 20.

If by reason of shocks or jarring, the temporary elongations of the rod and link gear have already occasioned improper adjusting effects resulting in an excessive pressure of the wheel 20, the braking stroke will occur sooner, the lever 3 will operate during the first part of this stroke, and the resulting tangential effort will overcome the resistance of the spring 5.

Figure 4:
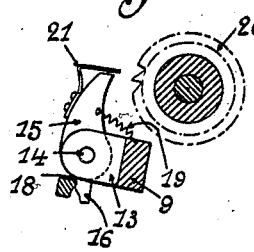
Fig. 4 is a section on the line 4—4 of Fig. 3.
Figure 3:
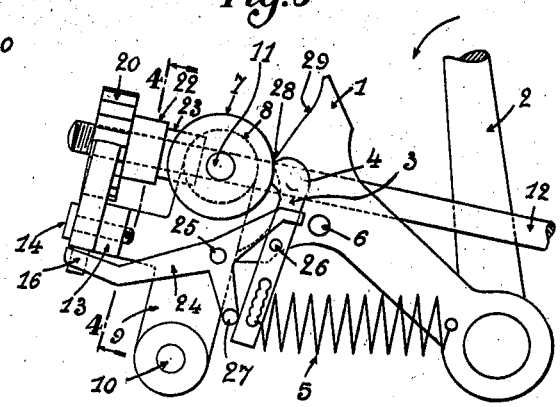
Fig. 3 shows the said device during the operation.

The lever 3 will then turn upon the axle 4; it will abut against the stud 27 of the lever 24 and will thus rotate the said lever; the latter slides upon the ramp 17 and thus engages in the notch 18, rotating the pawl 15 (Fig. 4) which thus remains disengaged during the whole braking operation, so that all adjustment becomes impossible. Upon returning to the inoperative position, the stud 26 of the lever 3 acts upon the corresponding arm of the lever 24 and releases it as well as the pawl 15.

The same effect takes place at each braking operation, until the wear permits a reduction of the effort upon the lever 3 on the point 28.

In view of the preceding considerations, the pawl can proceed beyond a tooth of the wheel only when in the maximum braking position. In the event of a succession of light braking operations, there might be produced a momentary displacement of the beginning of the braking operation, for, irrespectively of any wear that might have occurred, the pawl could not attain the point at which it passes over a tooth.

To obviate this defect, the jumping point of the pawl is for instance brought to a period somewhat after the beginning of the braking action, so that the lever 3 will alone determine the adjustment or the non-adjustment, and the pawl will be disengaged when the brake pressure on the wheel is sufficient or will be left free if any wear is to be taken up.

Obviously, the said invention is not limited to the devices hereinbefore set forth, which are given solely by way of example, and in particular the invention will not be modified if the arrangement of the cam 1 and the roller 7 is reversed, i. e. if the cam with its two inclined parts is mounted on the lever 9 and the roller is mounted at the end of an arm secured to the pedal 2.

Having now described my invention, what I claim as new and desire to secure by Letters Patent is:

1. In a brake control comprising a control member, a rocking member, one of said members being provided with a cam outline with two ramps of different slopes respectively corresponding to the preliminary stroke and to the effective braking stroke, a transmission rod and link attachment, adjusting means adapted to be actuated by said rocking member and to automatically compensate for the variations in length of the said transmission attachment, the combination of yielding means for operatively preventing any untimely operation of said adjusting means.

2. In a brake control comprising a control member, a rocking member, one of said members being provided with a cam outline with two ramps of different slopes respectively corresponding to the preliminary stroke and to the effective braking stroke, a transmission rod and link attachment, adjusting means adapted to be actuated by said rocking member and to automatically compensate for the variations in length of the said transmission attachment, the combination of a yieldingly mounted rocking lever adapted to oppose the effort due to the preliminary stroke and to oscillate under an abnormally great effort due to an untimely operation of said adjusting means and means adapted to operatively transmit the displacements of said rocking lever to said adjusting means and to prevent any untimely operation of the latter means.

3. In a brake control comprising a control member, a rocking member, one of said members being provided with a cam outline with two ramps of different slopes respectively corresponding to the preliminary stroke and to the effective braking stroke, a transmission rod and link attachment, a pawl and ratchet wheel mechanism adapted to be actuated by said rocking member and to automatically compensate for the variations in length of the said transmission attachment, the combination of a yieldingly mounted rocking lever adapted to oppose the effort due to the preliminary stroke and to oscillate under an abnormally great effort due to an untimely operation of said adjusting means, a pin secured on said rocking lever, a three arm rocking lever, whereof one arm is adapted to operatively engage said pin, a second arm is adapted to abut against said first named rocking lever and the third arm is adapted to operatively engage an extension provided on said pawl and to operatively prevent any untimely working of said pawl.

4. In a brake control comprising a control member, a rocking member, one of said members being provided with a cam outline with two ramps of different slopes respectively corresponding to the preliminary stroke and to the effective braking stroke, a transmission rod and link attachment, a pawl and ratchet wheel mechanism adapted to be actuated by said rocking member and to automatically compensate for the variations in length of the said transmission attachment, the combination of a rocking lever yieldingly mounted on one of said two first named members and adapted to oppose the effort due to the preliminary stroke and to oscillate under an abnormally great effort due to an untimely operation of said adjusting means, a pin secured on said rocking lever, a roller, an adjustable yielding member adapted to cooperate with said rocking lever and to cause the latter to bear against said roller, a three arm rocking lever rotatably mounted on the other of said two first named members and whereof one arm is adapted to operatively engage said pin, a second arm is adapted to abut against said first named rocking lever and the third arm is adapted to operatively engage an extension provided on said pawl and to operatively prevent any untimely working of said pawl.

In testimony whereof I have signed my name to this specification.

FRANCIS ATHIMON.